US 12,522,884 B2

(12) United States Patent
Yoshida et al.

(10) Patent No.: US 12,522,884 B2
(45) Date of Patent: *Jan. 13, 2026

(54) HOT-ROLLED STEEL SHEET

(71) Applicant: NIPPON STEEL CORPORATION, Tokyo (JP)

(72) Inventors: Mitsuru Yoshida, Tokyo (JP); Hiroshi Shuto, Tokyo (JP); Kazumasa Tsutsui, Tokyo (JP); Koutarou Hayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 401 days.

This patent is subject to a terminal disclaimer.

(21) Appl. No.: 18/021,066

(22) PCT Filed: Jun. 15, 2021

(86) PCT No.: PCT/JP2021/022672
§ 371 (c)(1),
(2) Date: Feb. 13, 2023

(87) PCT Pub. No.: WO2022/044494
PCT Pub. Date: Mar. 3, 2022

(65) Prior Publication Data
US 2023/0323496 A1    Oct. 12, 2023

(30) Foreign Application Priority Data

Aug. 27, 2020  (JP) .................................. 2020-143746

(51) Int. Cl.
*C21D 8/02*  (2006.01)
*C21D 9/46*  (2006.01)
(Continued)

(52) U.S. Cl.
CPC ............. *C21D 8/0226* (2013.01); *C21D 9/46* (2013.01); *C22C 38/001* (2013.01);
(Continued)

(58) Field of Classification Search
None
See application file for complete search history.

(56) References Cited

U.S. PATENT DOCUMENTS 6,544,354 B1    4/2003  Kawano et al.
11,236,412 B2   2/2022  Sano et al.
(Continued)

FOREIGN PATENT DOCUMENTS

CN    103459647 A    12/2013
CN    107250411 A    10/2017
(Continued)

OTHER PUBLICATIONS

Naik et al., "Texture-Based Metallurgical Phase Identification in Structural Steels: A Supervised Machine Learning Approach", Metals, 2019, vol. 9, 546, total 13 pages.
(Continued)

*Primary Examiner* — Anthony M Liang
(74) *Attorney, Agent, or Firm* — Birch, Stewart, Kolasch & Birch, LLP (57) ABSTRACT

This hot-rolled steel sheet has a predetermined chemical composition, in a microstructure, in terms of area %, residual austenite is less than 3.0%, ferrite is less than 15.0%, and pearlite is less than 5.0%, an E value that indicates periodicity of the microstructure is less than 10.7, and an I value that indicates uniformity of the microstructure is less than 1.020, a standard deviation of a Mn concentration is 0.60 mass % or less, and a tensile strength is 780 MPa or more.

5 Claims, 1 Drawing Sheet (51) Int. Cl.

| | | |
|---|---|---|
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |

(52) U.S. Cl.
CPC ............ *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C21D 2211/001* (2013.01); *C21D 2211/005* (2013.01); *C21D 2211/009* (2013.01)

(56) References Cited

U.S. PATENT DOCUMENTS

| | | |
|---|---|---|
| 2014/0014236 A1 | 1/2014 | Nozaki et al. |
| 2016/0273066 A1 | 9/2016 | Sakakibara et al. |
| 2017/0349967 A1 | 12/2017 | Yokoi et al. |
| 2018/0044749 A1 | 2/2018 | Shuto et al. |
| 2021/0140005 A1 | 5/2021 | Yoshida et al. |
| 2023/0295783 A1 | 9/2023 | Shuto et al. |
| 2023/0323496 A1 | 10/2023 | Yoshida et al. |
| 2024/0384378 A1 | 11/2024 | Shuto et al. |
| 2025/0101553 A1 | 3/2025 | Hiroshima et al. |

FOREIGN PATENT DOCUMENTS

| | | | |
|---|---|---|---|
| EP | 1 028 167 A2 | | 8/2000 |
| EP | 3 650 569 A1 | | 5/2020 |
| JP | 59-222528 A | | 12/1984 |
| JP | 10-168544 A | | 6/1998 |
| JP | 11-61326 A | | 3/1999 |
| JP | 3355970 B2 | | 12/2002 |
| JP | 2005-179703 A | | 7/2005 |
| JP | 2005-298924 A | | 10/2005 |
| JP | 2007-70648 A | | 3/2007 |
| JP | 2007-70649 A | | 3/2007 |
| JP | 2007-70661 A | | 3/2007 |
| JP | 4109619 B2 | | 7/2008 |
| JP | 2009-263685 A | | 11/2009 |
| JP | 4460343 B2 | | 5/2010 |
| JP | 2012-251200 A | | 12/2012 |
| JP | 2015-124410 A | | 7/2015 |
| JP | 2015-196891 A | | 11/2015 |
| JP | 2017150051 A | * | 8/2017 |
| WO | WO 2014/185405 A1 | | 11/2014 |
| WO | WO 2018/026014 A1 | | 2/2018 |
| WO | WO 2019/009410 A1 | | 1/2019 |
| WO | WO 2020/044445 A1 | | 3/2020 |

OTHER PUBLICATIONS

Webel et al., "A new analysis approach based on Haralick texture features for the characterization of microstructure on the example of low-alloy steels", Materials Characterization, 2018, vol. 144, pp. 584-596.

Zuiderveld, "Contrast Limited Adaptive Histogram Equalization, Chapter VIII.5", Graphics Gems IV. P.S. Heckbert (Eds.), Cambridge, MA, Academic Press, 1994, pp. 474-485.

U.S. Office Action for U.S. Appl. No. 18/016,141, dated Apr. 30, 2025.

U.S. Office Action for U.S. Appl. No. 18/020,598, dated May 13, 2025.

* cited by examiner

FIG. 1A  FIG. 1B

HOT-ROLLED STEEL SHEET

TECHNICAL FIELD OF THE INVENTION

The present invention relates to a hot-rolled steel sheet. Specifically, the present invention relates to a hot-rolled steel sheet that is formed into various shapes by press working or the like to be used, and particularly relates to a hot-rolled steel sheet that has high strength and has excellent shearing workability.

Priority is claimed on Japanese Patent Application No. 2020-143746, filed on Aug. 27, 2020, the content of which is incorporated herein by reference.

BACKGROUND ART

In recent years, from the viewpoint of protecting the global environment, efforts have been made to reduce the amount of carbon dioxide gas emitted in many fields. Vehicle manufacturers are also actively developing techniques for reducing the weight of vehicle bodies for the purpose of reducing fuel consumption. However, it is not easy to reduce the weight of vehicle bodies since the emphasis is placed on improvement in collision resistance to secure the safety of the occupants.

In order to achieve both vehicle body weight reduction and collision resistance, an investigation has been conducted to make a member thin by using a high-strength steel sheet. Therefore, there is a strong demand for a steel sheet having both high strength and excellent formability, and several techniques have been conventionally proposed to meet this demand. Vehicle members are formed by press forming, and the press-formed blank sheet is often manufactured by highly productive shearing working. Since the clearance in blanking is not always constant, it is preferable that the end surface accuracy after shearing working is stable even with various clearances. For example, it is preferable that the proportion of a shear droop in the sheared end surface after shearing working is stable regardless of the clearance.

Regarding the shearing workability, for example, Patent Document 1 discloses a technique for controlling burr height after punching by controlling a ratio $d_s/d_b$ of the ferrite grain size $d_s$ of the surface layer to the ferrite crystal grain $d_b$ of an inside to 0.95 or less.

Patent Document 2 discloses a technique for improving separations or burrs on an end surface of a sheet by reducing a P content.

PRIOR ART DOCUMENT

Patent Document

[Patent Document 1] Japanese Unexamined Patent Application, First Publication No. H10-168544
[Patent Document 2] Japanese Unexamined Patent Application, First Publication No. 2005-298924

Non-Patent Document

[Non-Patent Document 1] J. Webel, J. Gola, D. Britz, F. Mucklich, Materials Characterization 144 (2018) 584-596
[Non-Patent Document 2] D. L. Naik, H. U. Sajid, R. Kiran, Metals 2019, 9,
[Non-Patent Document 3] K. Zuiderveld, Contrast Limited Adaptive Histogram Equalization, Chapter VIII. 5, Graphics Gems IV. P. S. Heckbert (Eds.), Cambridge, MA, Academic Press, 1994, pp. 474-485

DISCLOSURE OF THE INVENTION

Problems to be Solved by the Invention

However, in Patent Document 1, the target is IF steel, and it may be difficult to apply the target to members having a high strength of 780 MPa or more. In Patent Document 2, a strength of 780 MPa or more is obtained, but the stability of a shear droop on a sheared end surface after shearing working is not investigated.

The present invention has been made in view of the above problems of the related art, and an object of the present invention is to provide a hot-rolled steel sheet having high strength and excellent shearing workability.

Means for Solving the Problem

In view of the above problems, the present inventors obtained the following findings (a) to (f) as a result of intensive studies on the chemical composition of the hot-rolled steel sheet and a relationship between a microstructure and mechanical properties, and completed the present invention. Having excellent shearing workability indicates that the proportion of a shear droop in the sheared end surface after shearing working is stable regardless of the clearance during shearing working. In addition, the expression of having excellent strength or having high strength indicates that the tensile strength is 780 MPa or more.

(a) In order to obtain an excellent tensile (maximum) strength, it is preferable to utilize a full hard structure. That is, it is preferable to contain martensite or bainite in the microstructure.

(b) In order to stabilize the proportion of a shear droop in a sheared end surface, it is important that Mn segregation does not occur much, the microstructural morphology is periodic, and the microstructure is made to be non-uniform (poorly uniform).

(c) Specifically, it is effective to control the standard deviation of the Mn concentration to a certain value or less and to control the periodicity of the microstructure and the uniformity of the microstructure for stabilizing the proportion of a shear droop in the sheared end surface.

(d) In order to control the standard deviation of the Mn concentration to a certain value or less, a slab heating step and a subsequent hot rolling step are important. For example, it is effective that the steel sheet is held in a temperature range of 700° C. to 850° C. for 900 seconds or longer, further heated, and held in a temperature range of 1100° C. or higher for 6000 seconds or longer and that hot rolling is performed such that a total of 90% or more of the sheet thickness reduces in a temperature range of 850° C. to 1100° C.

(e) In order to enhance the periodicity of the microstructure, it is important to control the recrystallization behavior of austenite during hot rolling. For example, it is effective to control the rolling reduction and rolling temperature of the final stage of hot rolling to within a predetermined range, set stress that is loaded to the steel sheet after rolling one stage before the final stage of hot rolling and before the final stage rolling to 170 kPa or more, and set stress that is loaded to the steel sheet after the final stage of hot rolling and until the steel sheet is cooled to 750° C. to 200 kPa or more. Such hot rolling conditions make it possible to produce fine and flat austenite grains and make it possible to enhance the periodicity of the microstructure as a result in combination with conditions for subsequent cooling.

(f) In order to reduce the uniformity of the microstructure, it is effective to promote the precipitation of an iron carbide by cooling the steel sheet to a temperature range of 400° C. or higher and lower than 600° C. and then coiling the steel sheet.

The gist of the present invention made based on the above findings is as follows.

(1) A hot-rolled steel sheet according to one aspect of the present invention containing, in terms of mass %, as a chemical composition,
  C: 0.050% to 0.250%,
  Si: 0.05% to 3.00%,
  Mn: 1.00% to 4.00%,
  one or two or more of Ti, Nb, and V: 0.060% to 0.500% in total,
  sol. Al: 0.001% to 2.000%,
  P: 0.100% or less,
  S: 0.0300% or less,
  N: 0.1000% or less,
  O: 0.0100% or less,
  Cu: 0% to 2.00%,
  Cr: 0% to 2.00%,
  Mo: 0% to 1.00%,
  Ni: 0% to 2.00%,
  B: 0% to 0.0100%.
  Ca: 0% to 0.0200%,
  Mg: 0% to 0.0200%,
  REM: 0% to 0.1000%,
  Bi: 0% to 0.020%,
  one or two or more of Zr, Co, Zn, and W: 0% to 1.00% in total,
  Sn: 0% to 0.05%, and
  a remainder consisting of Fe and impurities,
  in which, in a microstructure,
  in terms of area %, residual austenite is less than 3.0%, ferrite is less than 15.0%, and pearlite is less than 5.0%.
  an E value that indicates periodicity of the microstructure is less than 10.7, and an I value that indicates uniformity of the microstructure is less than 1.020,
  a standard deviation of a Mn concentration is 0.60 mass % or less, and
  a tensile strength is 780 MPa or more.

(2) The hot-rolled steel sheet according to (1), in which ds/dq, which is a ratio of an average crystal grain size ds of a surface layer to an average crystal grain size dq at a ¼ depth position of a sheet thickness from a surface, may be 0.95 or less.

(3) The hot-rolled steel sheet according to (1) or (2) may further contain, in terms of mass %, one or two or more selected from the group consisting of, as the chemical composition
  Cu: 0.01% to 2.00%,
  Cr: 0.01% to 2.00%,
  Mo: 0.01% to 1.00%,
  Ni: 0.02% to 2.00%,
  B: 0.0001% to 0.0100%,
  Ca: 0.0005% to 0.0200%,
  Mg: 0.0005% to 0.0200%,
  REM: 0.0005% to 0.1000%, and
  Bi: 0.0005% to 0.020%.

Effects of the Invention

According to the above aspect according to the present invention, it is possible to obtain a hot-rolled steel sheet having excellent strength and shearing workability. In addition, according to the preferable aspect according to the present invention, it is possible to obtain a hot-rolled steel sheet which has the above various properties and, furthermore, suppresses the occurrence of inside bend cracking, that is, has excellent inside bend cracking resistance.

The hot-rolled steel sheet according to the above aspect of the present invention is suitable as an industrial material used for vehicle members, mechanical structural members, and building members.

BRIEF DESCRIPTION OF THE DRAWINGS

FIG. 1 is a view for describing a method for measuring the proportion of a shear droop in a sheared end surface after shearing working.

EMBODIMENTS OF THE INVENTION

The chemical composition and microstructure of a hot-rolled steel sheet according to the present embodiment (hereinafter, sometimes simply referred to as the steel sheet) will be more specifically described below. However, the present invention is not limited only to a configuration disclosed in the present embodiment, and various modifications can be made without departing from the scope of the gist of the present invention.

The numerical limit range described below with "to" in between includes the lower limit and the upper limit. Regarding the numerical value indicated by "less than" or "more than", the value does not fall within the numerical range. In the following description, % regarding the chemical composition of the steel sheet is mass % unless particularly otherwise specified.

1. Chemical Composition

The hot-rolled steel sheet according to the present embodiment includes, in terms of mass %, C: 0.050% to 0.250%, Si: 0.05% to 3.00%, Mn: 1.00% to 4.00%, one or two or more of Ti, Nb, and V: 0.060% to 0.500% in total, sol. Al: 0.001% to 2.000%, P: 0.100% or less, S: 0.0300% or less, N: 0.1000% or less, O: 0.0100% or less, and a remainder consisting of Fe and impurities. Each element will be described in detail below.

(1-1) C: 0.050% to 0.250%

C increases the fraction of a hard phase and increases the strength of ferrite by bonding to a precipitation hardening element such as Ti, Nb, or V. When the C content is less than 0.050%, it is difficult to obtain a desired strength. Furthermore, the stability of a shear droop on the sheared end surface deteriorates. Therefore, the C content is set to 0.050% or more. The C content is preferably 0.060% or more, more preferably 0.070% or more, and still more preferably 0.080% or more.

On the other hand, when the C content is more than 0.250%, the weldability of the hot-rolled steel sheet deteriorates. Therefore, the C content is set to 0.250% or less. The C content is preferably 0.150% or less.

(1-2) Si: 0.05% to 3.00%

Si has an action of increasing the strength of the hot-rolled steel sheet by solid solution strengthening. In addition, Si has an action of making steel sound by deoxidation (suppressing the occurrence of a defect such as a blowhole in steel). When the Si content is less than 0.05%, an effect by the action cannot be obtained. Therefore, the Si content is set to 0.05% or more. The Si content is preferably 0.50% or more and more preferably 0.80% or more.

However, when the Si content is more than 3.00%, the surface properties, the chemical convertibility, the ductility and the weldability of the hot-rolled steel sheet are significantly deteriorated, and the $A_3$ transformation point is significantly increased. Therefore, it becomes difficult to perform hot rolling in a stable manner. Furthermore, the stability of a shear droop on the sheared end surface deteriorates. Therefore, the Si content is set to 3.00% or less. The Si content is preferably 2.70% or less and more preferably 2.50% or less.

(1-3) Mn: 1.00% to 4.00%

Mn has an action of suppressing ferritic transformation to achieve the high-strengthening of the hot-rolled steel sheet. When the Mn content is less than 1.00%, a tensile strength of 780 MPa or more cannot be obtained. Furthermore, the stability of a shear droop on the sheared end surface deteriorates. Therefore, the Mn content is set to 1.00% or more. The Mn content is preferably 1.30% or more and more preferably 1.50% or more.

On the other hand, when the Mn content is more than 4.00%, cracking occurs in the vicinity of the sheet thickness center due to center segregation of Mn, and the sheared end surface properties after shearing working deteriorate. Therefore, the Mn content is set to 4.00% or less. The Mn content is preferably 3.70% or less and more preferably 3.50% or less.

(1-4) One or Two or More of Ti, Nb, and V: 0.060% to 0.500% in Total

Ti, Nb, and V are elements that are finely precipitated in steel as a carbide and a nitride and improve the strength of steel by precipitation hardening. In addition, Ti, Nb, and V are elements that fix C by forming the above carbide and suppress the formation of cementite that is harmful to shearing workability. When the total amount of Ti, Nb, and V is less than 0.060%, these effects cannot be obtained. Therefore, the total amount of Ti, Nb, and V is set to 0.060% or more. Not all of Ti, Nb, and V need to be contained, and any one thereof may be contained in a quantity of 0.060% or more: In a case where two or more of Ti, Nb, and V are contained, the total content thereof may be 0.060% or more. The total amount of Ti, Nb, and Vis preferably 0.080% or more and more preferably 0.100% or more.

On the other hand, when the total amount of Ti, Nb, and V exceeds 0.500%, the workability of the hot-rolled steel sheet deteriorates. Therefore, the total amount of Ti, Nb, and V is set to 0.500% or less. The total amount of Ti, Nb, and V is preferably 0.300% or less, more preferably 0.250% or less, and still more preferably 0.200% or less.

(1-5) sol. Al: 0.001% to 2.000%

Similar to Si, Al has an action of deoxidizing steel to make steel sound. When the sol. Al content is less than 0.001%, an effect by the action cannot be obtained. Therefore, the sol. Al content is set to 0.001% or more. The sol. Al content is preferably 0.010% or more.

On the other hand, when the sol. Al content is more than 2.000%, the above effects are saturated, which is not economically preferable, and thus the sol. Al content is set to 2.000% or less. The sol. Al content is preferably 1.500% or less, more preferably 1.300% or less, and still more preferably 1.000% or less.

The sol. Al means acid-soluble Al and refers to solid solution Al present in steel in a solid solution state.

(1-6) P: 0.100% or Less

P is an element that is generally contained as an impurity, and has an action of increasing the strength of the hot-rolled steel sheet by solid solution strengthening. Therefore, P may be positively contained, but P is an element that is easily segregated, and, when the P content exceeds 0.100%, the deterioration of ductility attributed to boundary segregation becomes significant. Therefore, the P content is set to 0.100% or less. The P content is preferably 0.030% or less. The lower limit of the P content does not need to be particularly specified, but is preferably set to 0.001% from the viewpoint of the refining cost.

(1-7) S: 0.0300% or Less

S is an element that is contained as an impurity and forms a sulfide-based inclusion in steel to degrade the ductility of the hot-rolled steel sheet. When the S content is more than 0.0300%; the ductility of the hot-rolled steel sheet significantly deteriorates. Therefore, the S content is set to 0.0300% or less. The S content is preferably 0.0050% or less. The lower limit of the S content does not need to be particularly specified, but is preferably set to 0.0001% from the viewpoint of the refining cost.

(1-8) N: 0.1000% or Less

N is an element that is contained in steel as an impurity and has an action of degrading the ductility of the hot-rolled steel sheet. When the N content is more than 0.1000%, the ductility of the hot-rolled steel sheet significantly deteriorates. Therefore, the N content is set to 0.1000% or less. The N content is preferably 0.0800% or less, more preferably 0.0700% or less, and still more preferably 0.0100% or less. Although the lower limit of the N content does not need to be particularly specified, in a case where one or two or more of Ti, Nb, and V are contained to further refine the microstructure, the N content is preferably set to 0.0010% or more and more preferably set to 0.0020% or more to promote the precipitation of a carbonitride.

(1-9) O: 0.0100% or Less

When a large amount of O is contained in steel, O forms a coarse oxide that becomes the starting point of fracture and causes brittle fracture and hydrogen-induced cracks. Therefore, the O content is set to 0.0100% or less. The O content is preferably 0.0080% or less and more preferably 0.0050% or less. The O content may be set to 0.0005% or more or 0.0010% or more to disperse a large number of fine oxides when molten steel is deoxidized.

The remainder of the chemical composition of the hot-rolled steel sheet according to the present embodiment may be Fe and an impurity. In the present embodiment, the impurities mean substances that are incorporated from ore as a raw material, a scrap, manufacturing environment, or the like and/or substances that are permitted to an extent that the hot-rolled steel sheet according to the present embodiment is not adversely affected.

Instead of a part of Fe, the hot-rolled steel sheet according to the present embodiment may contain Cu, Cr, Mo, Ni, B, Ca, Mg, REM, Bi, Zr, Co, Zn, W, and Sn as optional elements. In a case where the above optional elements are not contained, the lower limit of the content thereof is 0%. Hereinafter, the above optional elements will be described in detail.

(1-10) Cu: 0.01% to 2.00%, Cr: 0.01% to 2.00%, Mo: 0.01% to 1.00%, Ni: 0.02% to 2.00%, and B: 0.0001% to 0.0100%

All of Cu, Cr, Mo, Ni, and B have an action of enhancing the hardenability of the hot-rolled steel sheet. In addition, Cu and Mo have an action of being precipitated as a carbide in steel to increase the strength of the hot-rolled steel sheet. Furthermore, in a case where Cu is contained, Ni has an action of effectively suppressing the grain boundary cracking of a slab caused by Cu. Therefore, one or two or more of these elements may be contained.

Cu has an action of enhancing the hardenability of the hot-rolled steel sheet and an action of being precipitated as a carbide in steel at a low temperature to increase the strength of the hot-rolled steel sheet. In order to more reliably obtain the effect by the action, the Cu content is preferably set to 0.01% or more and more preferably set to 0.05% or more. However, when the Cu content is more than 2.00%, grain boundary cracking may occur in the slab in some cases. Therefore, the Cu content is set to 2.00% or less. The Cu content is preferably 1.50% or less and more preferably 1.00% or less.

As described above, Cr has an action of enhancing the hardenability of the hot-rolled steel sheet. In order to more reliably obtain the effect by the action, the Cr content is preferably set to 0.01% or more and more preferably set to 0.05% or more. However, when the Cr content is more than 2.00%, the chemical convertibility of the hot-rolled steel sheet significantly deteriorates. Therefore, the Cr content is set to 2.00% or less.

As described above, Mo has an action of enhancing the hardenability of the hot-rolled steel sheet and an action of being precipitated as a carbide in steel to increase the strength of the hot-rolled steel sheet. In order to more reliably obtain the effect by the action, the Mo content is preferably set to 0.01% or more and more preferably set to 0.02% or more. However, even when the Mo content is set to more than 1.00%, the effect by the action is saturated, which is not economically preferable. Therefore, the Mo content is set to 1.00% or less. The Mo content is preferably 0.50% or less and more preferably 0.20% or less.

As described above, Ni has an action of enhancing the hardenability of the hot-rolled steel sheet. In addition, in a case where Cu is contained, Ni has an action of effectively suppressing the grain boundary cracking of the slab caused by Cu. In order to more reliably obtain the effect by the action, the Ni content is preferably set to 0.02% or more. Since Ni is an expensive element, it is not economically preferable to contain a large amount of Ni. Therefore, the Ni content is set to 2.00% or less.

As described above, B has an action of enhancing the hardenability of the hot-rolled steel sheet. In order to more reliably obtain the effect by this action, the B content is preferably set to 0.0001% or more and more preferably set to 0.0002% or more. However, when the B content is more than 0.0100%, the formability of the hot-rolled steel sheet significantly deteriorates, and thus the B content is set to 0.0100% or less. The B content is preferably 0.0050% or less.

(1-11) Ca: 0.0005% to 0.0200%, Mg: 0.0005% to 0.0200%, REM: 0.0005% to 0.1000%, and Bi: 0.0005% to 0.020%

All of Ca, Mg, and REM have an action of enhancing the ductility of the hot-rolled steel sheet by adjusting the shape of inclusions in steel to a preferable shape. In addition, Bi has an action of enhancing the ductility of the hot-rolled steel sheet by refining the solidification structure. Therefore, one or two or more of these elements may be contained. In order to more reliably obtain the effect by the action, it is preferable that the amount of any one or more of Ca, Mg, REM, and Bi is set to 0.0005% or more. However, when the Ca content or Mg content is more than 0.0200% or when the REM content is more than 0.1000%, an inclusion is excessively formed in steel, and thus the ductility of the hot-rolled steel sheet may be conversely degraded in some cases. In addition, even when the Bi content is set to more than 0.020%, the above effect by the action is saturated, which is not economically preferable. Therefore, the Ca content and the Mg content are each set to 0.0200% or less, the REM content is set to 0.1000% or less, and the Bi content is set to 0.020% or less. The Bi content is preferably 0.010% or less.

Here, REM refers to a total of 17 elements consisting of Sc, Y, and lanthanoids, and the REM content refers to the total amount of these elements. In the case of the lanthanoids, the lanthanoids are industrially added in the form of misch metal.

(1-12) One or Two or More of Zr, Co, Zn, or W: 0% to 1.00% in Total and Sn: 0% to 0.05%

Regarding Zr, Co, Zn, and W, the present inventors have confirmed that, even when a total of 1.00% or less of these elements are contained, the effect of the hot-rolled steel sheet according to the present embodiment is not impaired. Therefore, one or two or more of Zr, Co, Zn, or W may be contained in a total of 1.00% or less.

In addition, the present inventors have confirmed that, even when a small amount of Sn is contained, the effect of the hot-rolled steel sheet according to the present embodiment is not impaired. However, when a large amount of Sn is contained, a defect may be generated during hot rolling, and thus the Sn content is set to 0.05% or less.

The chemical composition of the above hot-rolled steel sheet may be measured by a general analytical method. For example, inductively coupled plasma-atomic emission spectrometry (ICP-AES) may be used for measurement. sol. Al may be measured by the ICP-AES using a filtrate after a sample is decomposed with an acid by heating. C and S may be measured by using a combustion-infrared absorption method, N may be measured by using the inert gas melting-thermal conductivity method, and O may be measured using an inert gas melting-non-dispersive infrared absorption method.

2. Microstructure of Hot-Rolled Steel Sheet

Next, the microstructure of the hot-rolled steel sheet according to the present embodiment will be described.

In the microstructure of the hot-rolled steel sheet according to the present embodiment, in terms of area %, residual austenite is less than 3.0%, ferrite is less than 15.0%, and pearlite is less than 5.0%, the E value that indicates the periodicity of the microstructure is less than 10.7, the I value that indicates the uniformity of the microstructure is less than 1.020, and the standard deviation of the Mn concentration is 0.60 mass % or less. Therefore, the hot-rolled steel sheet according to the present embodiment can obtain a high strength and excellent shearing workability. In the present embodiment, the microstructural fractions, the E value, the I value, and the standard deviation of the Mn concentration in the microstructure at a ¼ depth position of the sheet thickness from the surface in a sheet thickness cross section parallel to the rolling direction are specified. The reason therefor is that the microstructure at this position indicates a typical microstructure of the steel sheet.

(2-1) Area Fraction of Residual Austenite: Less than 3.0%

In the present invention, when the area fraction of residual austenite is too large, the proportion of a shear droop in the sheared end surface may become unstable. It is presumed that residual austenite improves the work hardening capability of the hot-rolled steel sheet by transformation-induced plasticity (TRIP) and thus the proportion of a shear droop in the sheared end surface becomes unstable. When the area fraction of the residual austenite is 3.0% or more, the shearing workability of the hot-rolled steel sheet deteriorates. Therefore, the area fraction of the residual austenite is set to less than 3.0%. The area fraction of the residual austenite is preferably less than 1.5% and more preferably less than 1.0%. Since residual austenite is preferably as little as possible, the area fraction of the residual austenite may be 0%.

As the measurement method of the area fraction of the residual austenite, methods by X-ray diffraction, electron back scatter diffraction image (EBSP, electron back scattering diffraction pattern) analysis, and magnetic measurement and the like may be used and the measured values may differ depending on the measurement method. In the present embodiment, the area fraction of the residual austenite is measured by X-ray diffraction.

In the measurement of the area fraction of the residual austenite by X-ray diffraction in the present embodiment, the integrated intensities of a total of 6 peaks of $\alpha(110)$, $\alpha(200)$, $\alpha(211)$, $\gamma(111)$, $\gamma(200)$, and $\gamma(220)$ are obtained at a ¼ depth position of the sheet thickness (a region between a depth of ⅛ of the sheet thickness from the surface and a depth of ⅜ of the sheet thickness from the surface) of the hot-rolled steel sheet using Co-K$\alpha$ rays, and the area fraction of the residual austenite is obtained by calculation using the strength averaging method.

(2-2) Area Fraction of Ferrite: Less than 15.0%

Ferrite is a structure formed when fcc transforms into bcc at a relatively high temperature. Since ferrite has a high work hardening capability, when the area fraction of the ferrite is too large, the proportion of a shear droop in the sheared end surface becomes unstable. Therefore, the area fraction of the ferrite is set to less than 15.0%. The area fraction of the ferrite is preferably 12.0% or less, more preferably 10.0% or less, and still more preferably 8.0% or less. The area fraction of the ferrite is preferably as small as possible, and the lower limit of the area fraction of the ferrite may be 3.0%, 2.0%, or 0%.

(2-3) Area Fraction of Pearlite: Less than 5.0%

Pearlite is a lamellar microstructure in which cementite is precipitated in layers between ferrite. In addition, pearlite is a soft microstructure compared with bainite and martensite. When the area fraction of the pearlite is 5.0% or more, carbon is consumed by cementite that is contained in pearlite, and the strengths of martensite and bainite, which are the remainder in microstructure, decrease, and a tensile strength of 780 MPa or more cannot be obtained. Therefore, the area fraction of the pearlite is set to less than 5.0%. The area fraction of the pearlite is preferably 3.0% or less. In order to improve the stretch flangeability of the hot-rolled steel sheet, the area fraction of the pearlite is preferably reduced as much as possible, and the lower limit of the area fraction of the pearlite is preferably 2.0%, more preferably 1.0%, and still more preferably 0%

The hot-rolled steel sheet according to the present embodiment contains a full hard structure consisting of one or two or more of bainite, martensite, and tempered martensite as the remainder in microstructure other than residual austenite, ferrite, and pearlite.

Measurement of the area fractions of the microstructure is conducted by the following method. A sheet thickness cross section parallel to the rolling direction is mirror-finished and, furthermore, polished at room temperature with colloidal silica not containing an alkaline solution for 8 minutes, thereby removing strain introduced into the surface layer of a sample. In a random position of the sample cross section in a longitudinal direction, a region with a length of 50 μm and at a ¼ depth position of the sheet thickness from the surface (a region between a ⅛ depth of the sheet thickness from the surface and a ⅜ depth of the sheet thickness from the surface) is measured at a measurement interval of 0.1 μm by electron backscatter diffraction to obtain crystal orientation information. For the measurement, an EBSD device configured of a thermal field emission scanning electron microscope (JSM-7001F manufactured by JEOL) and an EBSD detector (DVC5 type detector manufactured by TSL) is used. At this time, the degree of vacuum inside the EBSD device is set to $9.6 \times 10^5$ Pa or less, the acceleration voltage is set to 15 kV, the irradiation current level is set to 13, and the electron beam irradiation level is set to 62. Furthermore, a reflected electron image is photographed at the same visual field. First, crystal grains where ferrite and cementite are precipitated in layers are specified from the reflected electron image, and the area fraction of the crystal grains is calculated, thereby obtaining the area fraction of pearlite. After that, for crystal grains except the crystal grains determined as pearlite, from the obtained crystal orientation information, regions where the grain average misorientation value is 1.0° or less are determined as ferrite using a "Grain Average Misorientation" function installed in software "OIM Analysis (registered trademark)" included in the EBSD analyzer. The area fraction of the region determined as the ferrite is obtained, thereby obtaining the area fraction of the ferrite.

Subsequently, under a condition of defining a 5° grain boundary in the residual region (a region where the grain average misorientation value is more than) 1.0° as a crystal grain boundary, when the maximum value of "Grain Average IQ" of a ferrite region is indicated by I$\alpha$, a region with more than I$\alpha$/2 is extracted as bainite, and a region with I$\alpha$/2 or less is extracted as "pearlite, martensite, and tempered martensite". The area fraction of the bainite is obtained by calculating the area ratio of the extracted bainite. In addition, the total of the area ratios of the martensite and the tempered martensite is obtained by calculating the area fractions of the extracted "pearlite, martensite, and tempered martensite" and subtracting the area fraction of the pearlite obtained by the above EBSD analysis.

(2-4) E Value: Less than 10.7, I Value: Less than 1.020

In order to stabilize the proportion of the shear droop in the sheared end surface after shearing working, it is important that the periodicity of the microstructure is high and the uniformity of the microstructure is reduced. In the present embodiment, the proportion of a shear droop in the sheared end surface is stabilized by controlling the E (Entropy) value that indicates the periodicity of the microstructure and the I (inverse differenced moment norm) value that indicates the uniformity of the microstructure.

The E value represents the periodicity of the microstructure. In a case where the brightness is periodically arranged due to an influence of the formation of a band-like structure or the like, that is, the periodicity of the microstructure is high, the E value decreases. In the present embodiment, since there is a need to make the microstructure highly periodic, it is necessary to decrease the E value. When the E value is 10.7 or more, the proportion of a shear droop in the sheared end surface is likely to fluctuate and becomes difficult to stabilize. It is presumed that the microstructure periodically arranged degrades the work hardening capability and makes it easy to stabilize the proportion of a shear droop in the sheared end surface. Therefore, the E value is set to less than 10.7. The E value is preferably 10.6 or less and more preferably 10.5 or less. The E value is preferably as low as possible, and the lower limit is not particularly specified and may be 8.0 or more, 9.0 or more, or 10.0 or more.

The I value represents the uniformity of the microstructure and increases as the area of a region having certain brightness increases. A low I value means that the uniformity of the microstructure is low. In the present embodiment, since there is a need to make the microstructure poorly uniform, it is necessary to reduce the I value. When the I value is low and the uniformity of the microstructure is low, the work hardening capability deteriorates, and thus it is possible to stabilize the proportion of a shear droop in the sheared end surface. When the I value is 1.020 or more, it is presumed that the proportion of a shear droop in the sheared end surface does not become stable. Therefore, the I value is set to less than 1.020. The I value is preferably 1.015 or less and more preferably 1.010 or less. The lower limit of the I value is not particularly specified and may be 0.900 or more, 0.950 or more, or 1.000 or more.

The E value and the I value can be obtained by the following method.

In the present embodiment, the photographing region of a SEM image photographed for calculating the E value and the I value is a ¼ depth position of the sheet thickness from the surface of the steel sheet (a region between a depth of ⅛ of the sheet thickness from the surface and a depth of ⅜ of the sheet thickness from the surface) in a sheet thickness cross section parallel to the rolling direction. The SEM image is photographed using an SU-6600 Schottky electron gun manufactured by Hitachi High-Technologies Corporation with a tungsten emitter and an acceleration voltage of 1.5 kV. Based on the above settings, the SEM image is output at a magnification of 1000 times and a gray scale of 256 gradations.

Next, on an image obtained by cutting out the obtained SEM image into a 880×880-pixel region, a smoothing treatment described in Non-Patent Document 3, in which the contrast-enhanced limit magnification is set to 2.0 and the tile grid size is 8×8 is performed. The smoothed SEM image is rotated counterclockwise from 0 degrees to 179 degrees in increments of 1 degree, excluding 90 degrees, and an image is created at each angle, thereby obtaining a total of 179 images. Next, from each of these 179 images, the frequency values of brightness between adjacent pixels are sampled in a matrix form using the GLCM method described in Non-Patent Document 1.

179 matrixes of the frequency values sampled by the above method are expressed as $p_k$ (k=0 ... 89, 91, ... 179) where k is a rotation angle from the original image. $p_k$'s generated for individual images are summed for all k's (k=0 ... 89, 91, ... 179), and then 256×256 matrixes P standardized such that the total of individual components becomes 1 are calculated. Furthermore, the E value and the I value are each calculated using the following formula (1) and formula (2) described in Non-Patent Document 2. In the following formula (1) and formula (2), the value at the $i^{th}$ row in the $j^{th}$ column of the matrix P is expressed as $P_{ij}$.

$$E = -\sum\nolimits_{i=1,j=1}^{i=256,j=256} P_{ij} \log P_{ij} \quad (1)$$

$$I = \sum\nolimits_{i=1,j=1}^{i=256,j=256} P_{ij}/(1+|i-j|/256) \quad (2)$$

(2-5) Standard Deviation of Mn Concentration: 0.60 Mass % or Less

The standard deviation of the Mn concentration at the ¼ depth position of the sheet thickness from the surface of the hot-rolled steel sheet according to the present embodiment is 0.60 mass % or less. This makes it possible to stabilize the proportion of a shear droop in the sheared end surface. It is presumed to be because the work hardening capability can be degraded by uniformly dispersing a hard phase in a structure in which the microstructure is periodically arranged. The standard deviation of the Mn concentration is preferably 0.50 mass % or less and more preferably 0.47 mass % or less. The value of the lower limit of the standard deviation of the Mn concentration is desirably as small as possible from the viewpoint of suppressing excessively large burrs, but the substantial lower limit is 0.10 mass % due to restrictions in the manufacturing process.

After a sheet thickness cross section parallel to the rolling direction of the hot-rolled steel sheet (L cross section) is mirror polished, and then a ¼ depth position of the sheet thickness from the surface of the steel sheet (a region between a depth of ⅛ of the sheet thickness from the surface and a depth of ⅜ of the sheet thickness from the surface) is measured with an electron probe microanalyzer (EPMA) to measure the standard deviation of the Mn concentration. As the measurement conditions, the acceleration voltage is set to 15 kV, the magnification is set to 5000 times, and the distribution image of a range that is 20 μm long in the sample rolling direction and 20 μm long in the sheet thickness direction and the sheet direction of the sample is measured. More specifically, the measurement interval is set to 0.1 μm, and the Mn concentrations at 40000 or more points are measured. Next, the standard deviation is calculated based on the Mn concentrations obtained from all of the measurement points, thereby obtaining the standard deviation of the Mn concentration.

(2-6) Ds/Dq, Ratio of Average Crystal Grain Size Ds of Surface Layer to Average Crystal Grain Size Dq at ¼ Depth Position of Sheet Thickness from Surface, being 0.95 or Less Inside bend cracking in the hot-rolled steel sheet can be suppressed by making the crystal grain size of the surface layer fine. As the strength of the hot-rolled steel sheet increases, it is more likely that cracking occurs from the inside bend during bending (hereinafter, referred to as inside bend cracking). The mechanism of inside bend cracking is presumed as follows. At the time of bending, compressive stress is generated in the inside bend. In the beginning, the working proceeds while the entire inside bend is uniformly distorted; however, as the amount of the working increases, distortion cannot proceed only with uniform distortion, and distortion proceeds with strain locally concentrating (generation of a shear deformation band). As this shear deformation band further grows, cracks are initiated along the shear band from the surface of the inside bend and propagate. It is presumed that the reason for the inside bend cracking to be more likely to occur in association with high-strengthening is that deterioration of work hardening capability in association with high-strengthening makes distortion proceed non-uniformly, which generates a shear deformation band at an early stage of the working (or under loose working conditions).

The present inventors found that, as the crystal grain size of the surface layer of the hot-rolled steel sheet becomes finer, local strain concentration is further suppressed, and it becomes more unlikely that inside bend cracking occurs. In order to obtain the above action, ds/dq, which is the ratio of the average crystal grain size ds of the surface layer of the hot-rolled steel sheet to the average crystal grain size dq at a ¼ depth position of the sheet thickness from the surface, is preferably set to 0.95 or less. ds/dq is more preferably 0.90 or less and still more preferably 0.85 or less. The lower limit of ds/dq is not particularly specified and may be 0.50 or more.

In the present embodiment, the surface layer is a region from the surface of the hot-rolled steel sheet to a depth position of 50 μm from the surface.

The crystal grain size of the surface layer is measured using the EBSP-OIM (electron back scatter diffraction pattern-orientation image microscopy) method. The EBSP-OIM method is performed using a device obtained by combining a scanning electron microscope and an EBSP analyzer and OIM Analysis (registered trademark) manufactured by AMETEK, Inc. In addition, the analyzable area of the EBSP-OIM method is a region that can be observed with the SEM. The EBSP-OIM method makes it possible to analyze a region with a minimum resolution of 20 nm, which varies depending on the resolution of the SEM.

At each of the surface layer of the hot-rolled steel sheet (a region from the surface of the hot-rolled steel sheet to a depth position of 50 μm) and a ¼ depth position from the surface (a region between a depth of ⅛ of the sheet thickness from the surface and a depth of ⅜ of the sheet thickness from the surface) in a sheet thickness cross section parallel to the rolling direction of the hot-rolled steel sheet, at least 5 visual fields are analyzed at a magnification of 1200 times in a 40 μm×30 μm region, and a place where the angle difference between adjacent measurement points is 5° or more is defined as a crystal grain boundary, and an area-averaged crystal grain size is calculated. The area-averaged crystal grain sizes obtained at the individual measurement positions are regarded as the average crystal grain size of the surface layer and the average crystal grain size at the ¼ depth position from the surface, 3. Tensile Strength Properties Among the mechanical properties of the hot-rolled steel sheets, the tensile strength properties (tensile strength) were evaluated according to JIS Z 2241:2011. A test piece was a No. 5 test piece of JIS Z 2241:2011, and the test direction is set to a direction perpendicular to the rolling direction.

In the hot-rolled steel sheet according to the present embodiment, the tensile (maximum) strength is 780 MPa or more. The tensile strength is preferably 980 MPa or more. When the tensile strength is less than 780 MPa, an applicable component is limited, and the contribution to vehicle body weight reduction is small. The upper limit does not need to be particularly limited and may be set to 1780 MPa from the viewpoint of suppressing the wearing of a die.

4. Sheet Thickness

The sheet thickness of the hot-rolled steel sheet according to the present embodiment is not particularly limited and may be set to 1.2 to 8.0 mm. When the sheet thickness of the hot-rolled steel sheet is less than 1.2 mm, it may become difficult to secure the rolling finishing temperature and the rolling force may become excessive, which makes hot rolling difficult. Therefore, the sheet thickness of the hot-rolled steel sheet according to the present embodiment may be set to 1.2 mm or more. The sheet thickness is preferably 1.4 mm or more. On the other hand, when the sheet thickness is more than 8.0 mm, it becomes difficult to refine the microstructure, and it may be difficult to obtain the above microstructure. Therefore, the sheet thickness may be set to 8.0 mm or less. The sheet thickness is preferably 6.0 mm or less.

5. Others (5-1) Plating Layer

The hot-rolled steel sheet according to the present embodiment having the above-described chemical composition and microstructure may be provided with a plating layer on the surface for the purpose of improving corrosion resistance and the like and thereby made into a surface-treated steel sheet. The plating layer may be an electro plating layer or a hot-dip plating layer. Examples of the electro plating layer include electrogalvanizing, electro Zn—Ni alloy plating, and the like. Examples of the hot-dip plating layer include hot-dip galvanizing, hot-dip galvannealing, hot-dip aluminum plating, hot-dip Zn—Al alloy plating, hot-dip Zn—Al—Mg alloy plating, hot-dip Zn—Al—Mg—Si alloy plating, and the like. The plating adhesion amount is not particularly limited and may be the same as before. In addition, it is also possible to further enhance the corrosion resistance by performing an appropriate chemical conversion treatment (for example, the application and drying of a silicate-based chromium-free chemical conversion treatment liquid) after plating.

6. Manufacturing Conditions

A suitable method for manufacturing the hot-rolled steel sheet according to the present embodiment having the above-described chemical composition and microstructure is as follows.

In order to obtain the hot-rolled steel sheet according to the present embodiment, it is effective to perform hot rolling after heating a slab under predetermined conditions, perform accelerated cooling to a predetermined temperature range, then, slowly cool the slab, and control the cooling history until coiling.

In the suitable method for manufacturing the hot-rolled steel sheet according to the present embodiment, the following steps (1) to (6) are sequentially performed. The temperature of the slab and the temperature of the steel sheet in the present embodiment refer to the surface temperature of the slab and the surface temperature of the steel sheet. In addition, stress refers to stress that is loaded in the rolling direction of the steel sheet.

(1) The slab is held in a temperature range of 700° C. to 850° C. for 900 seconds or longer, then, further heated, and held in a temperature range of 1100° C. or higher for 6000 seconds or longer.

(2) Hot rolling is performed in a temperature range of 850° C. to 1100° C. so that the sheet thickness is reduced by a total of 90% or more.

(3) Stress of 170 kPa or more is loaded to the steel sheet after rolling one stage before the final stage of the hot rolling and before the final stage rolling.

(4) The rolling reduction at the final stage of the hot rolling is set to 8% or more, and the hot rolling is finished so that the rolling finishing temperature Tf becomes a temperature T1 (° C.) represented by the following formula (A) or higher and lower than 900° C.

(5) Stress that is loaded to the steel sheet after the final stage rolling of the hot rolling and until the steel sheet is cooled to 750° C. is set to 200 kPa or more.

(6) After the finishing of the hot rolling, accelerated cooling is performed to a temperature range of 600° C. or lower at an average cooling rate of 50° C./s or faster. It is more preferable to cool the steel sheet to a temperature range of the hot rolling finishing temperature Tf–50° C. or lower within 1 second after the finishing of the hot rolling.

(7) The stay time in a temperature range of 600° C. to 730° C. is set to 3.0 seconds or shorter.

(8) The steel sheet is coiled in a temperature range of 400° C. or higher and lower than 600° C.

$$T1(° C.) = 868 - 396 \times [C] - 68.1 \times [Mn] + 24.6 \times [Si] - 36.1 \times [Ni] - 24.8 \times [Cr] - 20.7 \times [Cu] + 250 \times [sol. Al] \quad (A)$$

However, the [element symbol] in the formula (A) indicates the content (mass %) of each element in the steel. When the element is not contained, substitution is performed with 0.

A hot-rolled steel sheet having a microstructure with excellent strength and shearing workability can be stably manufactured by adopting the above manufacturing method. That is, when the slab heating conditions and the hot rolling conditions are appropriately controlled, the reduction of Mn segregation and the flattening of austenite before transformation are achieved, and, in cooperation with the cooling conditions after the hot rolling to be described below, a hot-rolled steel sheet having a microstructure being excellent in terms of strength and shearing workability can be stably manufactured.

(1) Slab, Slab Temperature when Subjected to Hot Rolling, and Holding Time

As the slab that is subjected to hot rolling, a slab obtained by continuous casting, a slab obtained by casting and blooming, or the like can be used, and, if necessary, it is possible to use the above slabs after hot working or cold working. The slab that is subjected to hot rolling is preferably held in a temperature range of 700° C. to 850° C. for 900 seconds or longer during slab heating, then, further heated, and held in a temperature range of 1100° C. or higher for 6000 seconds or longer. During holding in the temperature range of 700° C. to 850° C., the steel sheet temperature may be fluctuated or be maintained constant in this temperature range. In addition, during holding at 1100° C. or higher, the steel sheet temperature may be fluctuated or be maintained constant in the temperature range of 1100° C. or higher. In austenite transformation in the temperature range of 700° C. to 850° C., Mn is distributed between ferrite and austenite, and Mn can be diffused into the ferrite region by extending the transformation time. Accordingly, the Mn microsegregation unevenly distributed in the slab can be eliminated, and the standard deviation of the Mn concentration can be significantly reduced. In addition, the steel sheet is held in the temperature range of 1100° C. or higher for 6000 seconds or longer, which makes it possible to uniform austenite grains during slab heating.

In the hot rolling, it is preferable to use a reverse mill or a tandem mill for multi-pass rolling. Particularly, from the viewpoint of industrial productivity and the viewpoint of stress loading on the steel sheet during the rolling, at least the final two stages are more preferably hot rolling in which a tandem mill is used.

(2) Rolling Reduction of Hot Rolling: Total Sheet Thickness Reduction of 90% or More in Temperature Range of 850° C. To 1100° C.

When the hot rolling is performed so that the sheet thickness is reduced by a total of 90% or more in a temperature range of 850° C. to 1100° C., mainly recrystallized austenite grains are refined, and accumulation of strain energy into the unrecrystallized austenite grains is promoted. In addition, the recrystallization of austenite is promoted, and the atomic diffusion of Mn is promoted, which makes it possible to reduce the standard deviation of the Mn concentration. Therefore, it is preferable to perform the hot rolling so that the sheet thickness is reduced by a total of 90% or more in the temperature range of 850° C. to 1100° C.

The sheet thickness reduced in the temperature range of 850° C. to 1100° C. can be expressed as $\{(t_0-t_1)/t_0\} \times 100 (\%)$ where an inlet sheet thickness before the first rolling in the rolling in this temperature range is to and an outlet sheet thickness after the final stage rolling in the rolling in this temperature range is $t_1$.

(3) Stress Loaded after Rolling One Stage Before Final Stage of Hot Rolling and Before Final Stage Rolling: 170 KPa or More The stress that is loaded to the steel sheet after rolling one stage before the final stage of hot rolling and before the final stage rolling is preferably set to 170 kPa or more. This increases the number of crystal grains having a {110}<001> crystal orientation in the recrystallized austenite after the rolling one stage before the final stage. Since {110}<001> is a crystal orientation that is difficult to recrystallize, recrystallization by the final stage rolling can be effectively suppressed by promoting the formation of this crystal orientation. As a result, it is possible to obtain a microstructure in which the E value is preferably controlled. The stress that is loaded to the steel sheet is more preferably 190 kPa or more. The stress that is loaded to the steel sheet can be controlled by adjusting the roll rotation speed during tandem rolling.

(4) Rolling Reduction at Final Stage of Hot Rolling: 8% or More, Hot Rolling Finishing Temperature Tf: T1 (° C.) or Higher and Lower than 900° C.

It is preferable that the rolling reduction at the final stage of the hot rolling is set to 8% or more and the hot rolling finishing temperature Tf is set to T1 (C) or higher. When the rolling reduction at the final stage of the hot rolling is set to 8% or more, austenite grains are flattened by the final stage rolling, a band-like structure of the hot-rolled steel sheet is formed, the periodicity of the microstructure increases, and the E value decreases. When the hot rolling finishing temperature Tf is set to T1 (C) or higher, it is possible to suppress an excessive increase in the number of ferrite nucleation sites in austenite. As a result, the formation of ferrite in the final structure (the microstructure of the hot-rolled steel sheet after manufacturing) is suppressed, and a high-strength hot-rolled steel sheet can be obtained. In addition, when Tf is set to lower than 900° C., it is possible to suppress the recrystallization and coarsening of austenite, the periodicity of the microstructure is enhanced, and a microstructure having a preferably controlled E value can be obtained.

(5) Stress Loaded after Final Stage Rolling of Hot Rolling and Until Steel Sheet being Cooled to 750° C.: 200 KPa or More Stress that is loaded to the steel sheet after the final stage rolling of the hot rolling and until the steel sheet is cooled to 750° C. is preferably set to 200 kPa or more. When the stress that is loaded to the steel sheet is set to 200 kPa or more, the flattening of austenite proceeds, and the periodicity of the microstructure can be enhanced. As a result, it is possible to obtain a microstructure in which the E value is preferably controlled.

(6) after Finishing of Hot Rolling, Accelerated Cooling to Temperature Range of 600 or Lower at Average Cooling Rate of 50° C./See or Faster, Preferably, Cooling to Temperature Range of Hot Rolling Finishing Temperature Tf–50° C. Or Lower within 1 Second after Finishing of Hot Rolling In order to suppress the growth of austenite crystal grain refined by the hot rolling, the steel sheet is more preferably cooled by 50° C. or more within 1 second after the finishing of the hot rolling. In order to cool the steel sheet to a temperature range of the hot rolling finishing temperature Tf–50° C. or lower within 1 second after the finishing of the hot rolling, it is preferable to perform cooling with a fast average cooling rate, for example, spraying of cooling water to the surface of the steel sheet, immediately after the finishing of the hot rolling. When the steel sheet is cooled to the temperature range of Tf−50° C. or lower within 1 second after the finishing of the hot rolling, it is possible to refine the crystal grain size of the surface layer and to enhance the inside bend cracking resistance.

In addition, when accelerated cooling is performed to a temperature range of 600° C. or lower at an average cooling rate of 50° C./sec or faster after the finishing of the hot rolling, it is possible to suppress the formation of ferrite and pearlite with a small amount of precipitation hardening. Accordingly, the strength of the hot-rolled steel sheet improves. The average cooling rate referred to herein is a value obtained by dividing the temperature drop width of the steel sheet from the start of accelerated cooling (when introducing the steel sheet into cooling equipment) to the completion of accelerated cooling (when deriving the steel sheet from the cooling equipment) by the time required from the start of accelerated cooling to the completion of accelerated cooling.

The upper limit of the cooling rate is not particularly specified, but when the cooling rate is increased, the cooling equipment becomes large and the equipment cost increases: Therefore, considering the equipment cost, the average cooling rate is preferably 300° C./sec or slower. In addition, the cooling stop temperature of the accelerated cooling is preferably set to 400° C. or higher in consideration of the relationship with the coiling temperature.

(7) Stay Time in Temperature Range of 600° C. To 730° C.: 3.0 Seconds or Shorter In order to suppress the formation of ferrite and pearlite and obtain a tensile strength of 780 MPa or more by making the primary phase structure full hard, the stay time in a temperature range of 600° C. to 730° C., which is the ferritic transformation temperature range, is preferably set to 3.0 seconds or shorter. The stay time in the temperature range of 600° C. to 730° C. is more preferably 2.0 seconds or shorter.

(7) Coiling Temperature: 400° C. Or Higher and Lower than 600° C.

The coiling temperature is set in a temperature range of 400° C. or higher and lower than 600° C. When the coiling temperature is set in this temperature range, the amount of an iron carbide precipitated is reduced, and the variation in the hardness distribution in the hard phase can be improved. As a result, it is possible to reduce the I value and to obtain excellent shearing workability.

Examples

Next, the effects of one aspect of the present invention will be described more specifically by way of examples, but the conditions in the examples are condition examples adopted for confirming the feasibility and effects of the present invention. The present invention is not limited to these condition examples. The present invention can adopt various conditions as long as the object of the present invention is achieved without departing from the gist of the present invention.

Steels having a chemical composition shown in Tables 1 and 2 were melted and continuously cast to manufacture slabs having a thickness of 240 to 300 mm. The obtained slabs were used to obtain hot-rolled steel sheets shown in Table 4A and Table 4B under the manufacturing conditions shown in Table 3A and Table 3B.

The area fraction of the microstructure, the E value, the I value, the standard deviation of the Mn concentration, ds/dq, which is the ratio of the average crystal grain size ds of the surface layer to the average crystal grain size dq at a ¼ depth position of the sheet thickness from the surface, and the tensile strength TS of each the obtained hot-rolled steel sheets were obtained by the above methods. The obtained measurement results are shown in Table 4A and Table 4B.

The remainder in microstructure was one or two or more of bainite, martensite, and tempered martensite.

Evaluation Method of Properties of Hot-Rolled Steel Sheets (1) Tensile Strength Properties In a case where the tensile strength TS was 780 MPa or more, the hot-rolled steel sheet was considered to be excellent in terms of strength and judged to be acceptable. On the other hand, in a case where the tensile strength TS was less than 780 MPa, the hot-rolled steel sheet was considered to be poor in strength and judged to be unacceptable.

(2) Shearing Workability

Figure 1A:
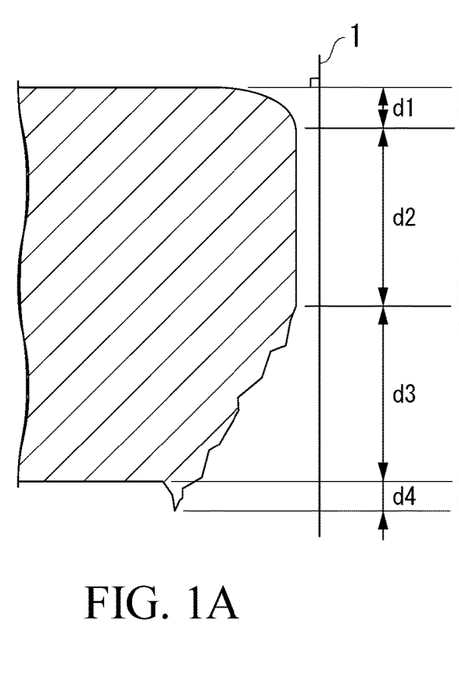
Figure 1B:
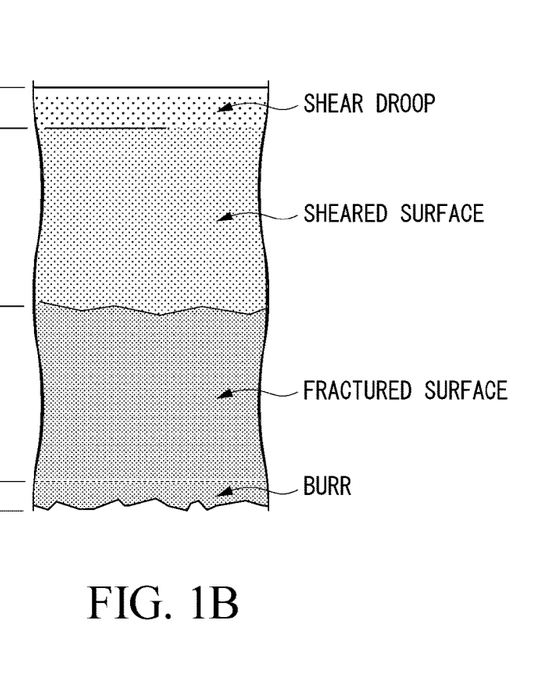

The shearing workability of the hot-rolled steel sheet was evaluated by obtaining the proportion of a shear droop in the end surface (shear droop proportion) after punching by a punching test. Three punched holes with a clearance of 10% and three punched holes with a clearance of 20% were produced with a hole diameter of 10 mm and a punching speed of 3 m/s. Next, the appearances of end surfaces parallel to the rolling direction (2 end surfaces per 1 punched hole) were photographed with an optical microscope in each punched hole. In the obtained observation photographs, end surfaces as shown in FIG. 1(*a*) could be observed. As shown in FIGS. 1(*a*) and 1(*b*), a shear droop, a sheared surface, a fractured surface, and a burr are observed on the end surface after punching. FIG. 1(*a*) is a schematic view of the end surface parallel to the rolling direction of the punched hole, and FIG. 1(*b*) is a schematic view of the side surface of the punched hole. The shear droop is an R-like smooth surface, the sheared surface is a punched end surface separated by shear deformation, the fractured surface is a punched end surface separated by a crack initiated from the vicinity of the cutting edge after the end of shear deformation, and a burr is a surface having projections protruding from the lower surface of the hot-rolled steel sheet. In the obtained observation photograph of the end surface, the shear droop proportion in the end surface was measured by a method to be described below. A value was calculated by dividing the shear droop proportion with a clearance of 20% by the shear droop proportion with a clearance of 10%. In a case where this value was 1.70 or less, the hot-rolled steel sheet was considered to have a stable proportion of a shear droop in the sheared end surface after shearing working, that is, be excellent in terms of shearing workability and judged to be acceptable. On the other hand, in a case where the value was more than 1.70, the hot-rolled steel sheet was considered to be poor in shearing workability and judged to be unacceptable.

The shear droop proportion in the end surface can be obtained by drawing a straight line 1 perpendicular to the upper surface and the lower surface of the hot-rolled steel sheet in the observation photograph of the end surface as shown in FIG. 1(*a*) and calculating the proportion of the length d1 of the shear droop in the total of the length d1 of the shear droop, the length d2 of the sheared surface, the length d3 of the fractured surface, and the length d4 of the burr in the straight line 1 (=d1/(d1+d2+d3+d4)×100).

(3) Inside Bend Cracking Resistance

The inside bend cracking resistance was evaluated by the following bending test.

A 100 mm×30 mm strip-shaped test piece was cut out from the hot-rolled steel sheet to obtain a bending test piece. For both a bend where the bending ridge was parallel to the rolling direction (L direction) (L-axis bending) and a bend where the bending ridge was parallel to a direction perpendicular to the rolling direction (C direction) (C-axis bending), inside bend cracking resistance was investigated according to JIS Z 2248:2014 (V block 90° bending test), and the minimum bend radii at which cracks were not initiated were obtained. A value obtained by dividing the average value of the minimum bend radii in the L axis and in the C axis by the sheet thickness was regarded as the limit bend R/t and used as an index value of inside bend cracking resistance. In a case where R/t was 2.5 or less, the hot-rolled steel sheet was determined to be excellent in terms of inside bend cracking resistance.

Here, regarding the presence or absence of cracks, a cross section obtained by cutting the test piece after the V block 90° bending test on a surface parallel to the bending direction and perpendicular to the sheet surface was mirror polished, then, cracks were observed with an optical microscope, and a case where the lengths of cracks observed in the inside bend of the test piece exceeded 30 μm was determined as cracks being present.

The obtained results are shown in Table 4A and Table 4B.

TABLE 1

| Steel No. | Mass %, remainder is Fe and impurities | | | | | | | | | | | | Note |
|---|---|---|---|---|---|---|---|---|---|---|---|---|---|
| | C | Si | Mn | Ti | Nb | V | Ti + Nb + V | sol. Al | P | S | N | O | |
| A | 0.051 | 1.11 | 1.64 | 0.090 | | | 0.090 | 0.035 | 0.020 | 0.0007 | 0.0033 | 0.0029 | Present Invention Example |
| B | 0.088 | 0.98 | 2.41 | 0.106 | | | 0.106 | 0.028 | 0.013 | 0.0031 | 0.0036 | 0.0037 | Present Invention Example |
| C | 0.152 | 1.28 | 2.33 | 0.127 | | | 0.127 | 0.062 | 0.014 | 0.0039 | 0.0031 | 0.0015 | Present Invention Example |
| D | 0.107 | 0.42 | 2.15 | 0.095 | | | 0.095 | 0.038 | 0.022 | 0.0038 | 0.0041 | 0.0026 | Present Invention Example |
| E | 0.076 | 2.75 | 2.50 | 0.108 | | | 0.108 | 0.041 | 0.029 | 0.0027 | 0.0022 | 0.0025 | Present Invention Example |
| F | 0.097 | 0.94 | 1.12 | 0.105 | | | 0.105 | 0.054 | 0.007 | 0.0042 | 0.0030 | 0.0017 | Present Invention Example |
| G | 0.094 | 1.20 | 3.75 | 0.104 | 0.044 | | 0.148 | 0.033 | 0.030 | 0.0015 | 0.0032 | 0.0046 | Present Invention Example |
| H | 0.098 | 0.82 | 2.29 | 0.064 | | | 0.064 | 0.042 | 0.028 | 0.0034 | 0.0025 | 0.0015 | Present Invention Example |
| I | 0.097 | 1.11 | 2.19 | | | 0.144 | 0.144 | 0.039 | 0.012 | 0.0058 | 0.0030 | 0.0037 | Present Invention Example |
| J | 0.093 | 1.11 | 2.23 | 0.040 | 0.026 | 0.067 | 0.133 | 0.032 | 0.017 | 0.0045 | 0.0035 | 0.0042 | Present Invention Example |
| K | 0.087 | 0.85 | 2.38 | 0.127 | | | 0.127 | 0.044 | 0.015 | 0.0035 | 0.0026 | 0.0040 | Present Invention Example |
| L | 0.074 | 0.85 | 2.30 | 0.114 | | | 0.114 | 0.051 | 0.029 | 0.0025 | 0.0039 | 0.0019 | Present Invention Example |
| M | 0.086 | 1.11 | 2.10 | 0.108 | | 0.056 | 0.164 | 0.045 | 0.025 | 0.0028 | 0.0028 | 0.0039 | Present Invention Example |
| N | 0.080 | 1.09 | 2.16 | 0.099 | | | 0.099 | 0.042 | 0.018 | 0.0045 | 0.0049 | 0.0025 | Present Invention Example |
| O | 0.097 | 1.10 | 2.18 | | 0.201 | | 0.201 | 0.049 | 0.011 | 0.0022 | 0.0033 | 0.0031 | Present Invention Example |
| P | <u>0.042</u> | 0.91 | 1.92 | 0.126 | | | 0.126 | 0.027 | 0.007 | 0.0040 | 0.0037 | 0.0020 | Comparative Example |
| Q | 0.089 | <u>3.18</u> | 2.16 | 0.099 | | | 0.099 | 0.029 | 0.019 | 0.0021 | 0.0028 | 0.0030 | Comparative Example |
| R | 0.093 | 0.84 | <u>0.76</u> | 0.123 | | | 0.123 | 0.065 | 0.019 | 0.0003 | 0.0072 | 0.0011 | Comparative Example |
| S | 0.054 | 1.10 | 1.88 | 0.042 | 0.011 | | <u>0.053</u> | 0.041 | 0.015 | 0.0050 | 0.0020 | 0.0045 | Comparative Example |
| T | 0.072 | 1.10 | 2.20 | 0.115 | | | 0.115 | 0.368 | 0.008 | 0.0025 | 0.0045 | 0.0029 | Present Invention Example |

Underlines indicate that corresponding values are outside the range of the present invention.

TABLE 2

| Steel No. | Mass %, remainder is Fe and impurities | | | | | | | | | | | | | | | T1 | Note |
|---|---|---|---|---|---|---|---|---|---|---|---|---|---|---|---|---|---|
| | Cu | Cr | Mo | Ni | B | Ca | Mg | REM | Bi | Zr | Co | Zn | W | Sn | | | |
| A | | | | | | 0.0020 | 0.0014 | | | | | | | | | 772 | Present Invention Example |
| B | | | | | | | | | | | | | | | | 700 | Present Invention Example |

TABLE 2-continued

| Steel No. | Cu | Cr | Mo | Ni | B | Ca | Mg | REM | Bi | Zr | Co | Zn | W | Sn | T1 | Note |
|---|---|---|---|---|---|---|---|---|---|---|---|---|---|---|---|---|
| C | | | | | | | | 0.0028 | | | | | | | 696 | Present Invention Example |
| D | | 0.43 | 0.26 | 0.22 | | | | | | | | | | | 680 | Present Invention Example |
| E | | | | | | | | | 0.004 | | | | | 0.15 | 746 | Present Invention Example |
| F | | | | | | | | | | | | | | | 790 | Present Invention Example |
| G | | | | | | | | | | | | | | | 613 | Present Invention Example |
| H | | | | | | | | | | 0.03 | | | | | 704 | Present Invention Example |
| I | | | | | | | | | | | | | | | 718 | Present Invention Example |
| J | | | | | | | | | | | | | | | 715 | Present Invention Example |
| K | 0.15 | | | | | | | | | | 0.19 | | | | 700 | Present Invention Example |
| L | | 0.21 | | | | | | | | | | | | | 711 | Present Invention Example |
| M | | | 0.12 | | | | | | | | | | | 0.03 | 729 | Present Invention Example |
| N | | | | 0.26 | | | | | | | | | | | 717 | Present Invention Example |
| O | | | | | 0.0018 | | | | | | | 0.02 | | | 720 | Present Invention Example |
| P | | | | | | | | | | | | | | | 750 | Comparative Example |
| Q | | | | | | | | | | | | | | | 771 | Comparative Example |
| R | | | | | | | | | | | | | | | 816 | Comparative Example |
| S | | | | | | | | | | | | | | | 756 | Comparative Example |
| T | | | | | | | | | | | | | | | 809 | Present Invention Example |

TABLE 3A

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage and before final stage rolling kPa | T1 | Hot rolling finishing temperature Tf ° C. | Rolling reduction of final stage % | Stress loaded after final stage rolling of hot rolling and until steel sheet being cooled to 750° C. kPa |
|---|---|---|---|---|---|---|---|---|---|---|
| 1 | A | 1205 | 1254 | 9265 | 92 | 205 | 772 | 844 | 11 | 210 |
| 2 | A | 1334 | 1244 | 8443 | 96 | 210 | 772 | 761 | 11 | 205 |
| 3 | B | 1467 | 1239 | 8898 | 93 | 182 | 700 | 866 | 10 | 205 |
| 4 | B | 1523 | 1254 | 8025 | 93 | 205 | 700 | 854 | 10 | 215 |
| 5 | B | 1249 | 1259 | 9154 | 98 | 200 | 700 | 823 | 13 | 217 |
| 6 | B | 1468 | 1251 | 9310 | 93 | 216 | 700 | 849 | 11 | 215 |
| 7 | B | 912 | 1231 | 8073 | 95 | 208 | 700 | 841 | 10 | 202 |
| 8 | B | 1323 | 1256 | 9176 | 95 | 237 | 700 | 845 | 11 | 203 |
| 9 | B | 768 | 1251 | 8885 | 93 | 218 | 700 | 862 | 11 | 211 |
| 10 | B | 1507 | 1249 | 821 | 88 | 219 | 700 | 854 | 11 | 207 |
| 11 | B | 1318 | 1225 | 4237 | 92 | 234 | 700 | 859 | 11 | 206 |
| 12 | B | 1291 | 1231 | 8249 | 97 | 125 | 700 | 887 | 9 | 202 |
| 13 | B | 1309 | 1245 | 7909 | 94 | 190 | 700 | 879 | 7 | 206 |
| 14 | C | 1115 | 1215 | 8707 | 96 | 221 | 696 | 857 | 12 | 200 |
| 15 | D | 1372 | 1241 | 8796 | 93 | 222 | 680 | 856 | 13 | 219 |

TABLE 3A-continued

| | | | | | | | | | | |
|---|---|---|---|---|---|---|---|---|---|---|
| 16 | E | 1282 | 1261 | 8521 | 94 | 212 | 746 | 844 | 11 | 204 |
| 17 | E | 1447 | 1245 | 8756 | 95 | 205 | 746 | 895 | 12 | 209 |
| 18 | F | 1470 | 1238 | 8932 | 93 | 210 | 790 | 861 | 11 | 202 |
| 19 | F | 1485 | 1256 | 9021 | 94 | 210 | 790 | 852 | 15 | 210 |
| 20 | G | 1368 | 1249 | 8753 | 95 | 204 | 613 | 847 | 10 | 215 |

| | Cooling amount for 1 second after finishing of hot rolling ° C. | Average cooling rate from hot rolling finishing to coiling temperature of 600° C. or lower ° C./s | Stay time in temperature range of 600° C. to 730° C. s | Coiling temperature ° C. | Note |
|---|---|---|---|---|---|
| 1 | 72 | 101 | 1.5 | 423 | Present Invention Example |
| 2 | 66 | 75 | 1.6 | 522 | Comparative Example |
| 3 | 79 | 98 | 2.0 | 519 | Present Invention Example |
| 4 | 79 | 112 | 1.5 | 520 | Present Invention Example |
| 5 | 62 | 82 | 1.2 | 503 | Present Invention Example |
| 6 | 42 | 104 | 1.4 | 456 | Present Invention Example |
| 7 | 79 | 116 | 2.1 | 507 | Present Invention Example |
| 8 | 73 | 100 | 1.5 | 435 | Present Invention Example |
| 9 | 70 | 84 | 2.1 | 535 | Comparative Example |
| 10 | 60 | 97 | 1.9 | 485 | Comparative Example |
| 11 | 63 | 86 | 2.1 | 555 | Comparative Example |
| 12 | 74 | 83 | 2.5 | 522 | Comparative Example |
| 13 | 57 | 55 | 2.5 | 520 | Comparative Example |
| 14 | 78 | 92 | 1.9 | 478 | Present Invention Example |
| 15 | 62 | 91 | 1.9 | 475 | Present Invention Example |
| 16 | 70 | 93 | 1.5 | 457 | Present Invention Example |
| 17 | 62 | 108 | 1.7 | <u>385</u> | Comparative Example |
| 18 | 59 | 100 | 1.6 | 518 | Present Invention Example |
| 19 | 65 | 52 | <u>5.4</u> | 565 | Comparative Example |
| 20 | 68 | 88 | 1.9 | 452 | Present Invention Example |

Underlines indicate that manufacturing conditions are not preferable.

TABLE 3B

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage and before final stage rolling kPa | T1 | Hot rolling finishing temperature Tf ° C. | Rolling reduction of final stage % | Stress loaded after final stage rolling of hot rolling and until steel sheet being cooled to 750° C. kPa | Cooling amount for 1 second after finishing of hot rolling ° C. | Average cooling rate from hot rolling finishing to coiling temperature of 600° C. or lower ° C./s | Stay time in temperature range of 600° C. to 730° C. s | Coiling temperature ° C. | Note |
|---|---|---|---|---|---|---|---|---|---|---|---|---|---|---|---|
| 21 | H | 1345 | 1277 | 8440 | 94 | 210 | 704 | 856 | 10 | 207 | 73 | 116 | 1.5 | 513 | Present Invention Example |
| 22 | I | 1159 | 1248 | 8949 | 95 | 216 | 718 | 860 | 11 | 219 | 75 | 80 | 1.9 | 452 | Present Invention Example |
| 23 | J | 1254 | 1240 | 8726 | 93 | 216 | 715 | 870 | 10 | 211 | 62 | 104 | 1.5 | 471 | Present Invention Example |
| 24 | K | 1267 | 1271 | 8282 | 96 | 218 | 700 | 852 | 10 | 204 | 61 | 120 | 1.5 | 523 | Present Invention Example |
| 25 | L | 1765 | 1259 | 8674 | 96 | 235 | 711 | 852 | 11 | 204 | 85 | 112 | 1.6 | 522 | Present Invention Example |
| 26 | M | 1436 | 1238 | 8236 | 94 | 223 | 729 | 870 | 10 | 214 | 65 | 102 | 1.7 | 496 | Present Invention Example |
| 27 | N | 1375 | 1239 | 8151 | 97 | 229 | 717 | 841 | 10 | 208 | 69 | 102 | 1.4 | 516 | Present Invention Example |
| 28 | O | 1387 | 1242 | 8481 | 95 | 204 | 720 | 843 | 12 | 214 | 71 | 117 | 1.5 | 530 | Present Invention Example |
| 29 | P | 1547 | 1251 | 8415 | 93 | 212 | 750 | 846 | 10 | 209 | | | | | |
| 30 | Q | 1536 | 1269 | 8459 | 92 | 225 | 771 | 861 | 10 | 216 | | | | | |
| 31 | R | 1675 | 1250 | 9071 | 96 | 238 | 816 | 851 | 11 | 212 | | | | | |
| 32 | S | 1286 | 1266 | 8532 | 96 | 213 | 756 | 848 | 12 | 203 | | | | | |
| 33 | T | 1267 | 1271 | 8282 | 96 | 218 | 809 | 852 | 16 | 204 | | | | | |
| 34 | T | 852 | 1254 | 7128 | 91 | 212 | 809 | 854 | 11 | 205 | | | | | |
| 35 | T | 1305 | 1243 | 5895 | 93 | 234 | 809 | 860 | 14 | 210 | | | | | |
| 36 | T | 1456 | 1240 | 7542 | 92 | 156 | 809 | 855 | 16 | 201 | | | | | |
| 37 | T | 1425 | 1254 | 8025 | 92 | 215 | 809 | 846 | 15 | 185 | | | | | |
| 38 | T | 1298 | 1252 | 7542 | 92 | 216 | 809 | 859 | 14 | 205 | | | | | |

TABLE 3B-continued

| | | | | | |
|---|---|---|---|---|---|
| 29 | 76 | 125 | 1.6 | 504 | Comparative Example |
| 30 | 67 | 113 | 1.6 | 512 | Comparative Example |
| 31 | 59 | 109 | 1.6 | 473 | Comparative Example |
| 32 | 73 | 66 | 2.0 | 562 | Comparative Example |
| 33 | 80 | 120 | 1.5 | 523 | Present Invention Example |
| 34 | 75 | 105 | 1.3 | 510 | Comparative Example |
| 35 | 63 | 86 | 1.7 | 524 | Comparative Example |
| 36 | 70 | 65 | 2.2 | 515 | Comparative Example |
| 37 | 65 | 78 | 1.9 | 524 | Comparative Example |
| 38 | 75 | <u>46</u> | 2.8 | 523 | Comparative Example |

Underlines indicate that manufacturing conditions are not preferable.

TABLE 4A

| Manu-facturing No. | Steel No. | Sheet thickness m | Ferrite Area % | Residual austenite Area % | Pearlite Area % | Remainder in micro-structure Area % | E value — | I value — | Mn standard deviation Mass % | ds/dq — | Tensile strength TS MPa | Ratio of shear droop proportion between 20% clearance and 10% clearance X20/X10 — | Limit bend R/t — | Note |
|---|---|---|---|---|---|---|---|---|---|---|---|---|---|---|
| 1 | A | 2.6 | 5.2 | 0.0 | 0.0 | 94.8 | 10.3 | 1.015 | 0.48 | 0.75 | 895 | 1.61 | 2.1 | Present Invention Example |
| <u>2</u> | A | 2.6 | <u>16.5</u> | 0.0 | 3.2 | 80.3 | <u>10.9</u> | 1.012 | 0.46 | 0.80 | <u>752</u> | <u>2.35</u> | 2.3 | Comparative Example |
| 3 | B | 2.6 | 9.8 | 0.0 | 0.0 | 90.2 | 10.6 | 1.009 | 0.41 | 0.70 | 1019 | 1.68 | 2.1 | Present Invention Example |
| 4 | B | 2.6 | 6.7 | 0.0 | 0.0 | 93.3 | 10.4 | 1.009 | 0.41 | 0.82 | 1019 | 1.30 | 2.3 | Present Invention Example |
| 5 | B | 2.6 | 7.3 | 0.0 | 0.0 | 92.7 | 10.2 | 1.002 | 0.45 | 0.71 | 1022 | 1.26 | 2.1 | Present Invention Example |
| 6 | B | 2.6 | 6.2 | 0.0 | 0.0 | 93.8 | 10.3 | 1.007 | 0.43 | 0.97 | 1040 | 1.48 | 2.8 | Present Invention Example |
| 7 | B | 2.6 | 10.5 | 0.0 | 0.0 | 89.5 | 10.3 | 1.006 | 0.52 | 0.70 | 1027 | 1.52 | 2.1 | Present Invention Example |
| 8 | B | 2.6 | 6.4 | 0.0 | 0.0 | 93.6 | 10.3 | 1.011 | 0.42 | 0.75 | 1049 | 1.51 | 2.2 | Present Invention Example |
| <u>9</u> | B | 2.6 | 10.6 | 0.0 | 0.0 | 89.4 | 10.6 | 1.008 | <u>0.65</u> | 0.77 | 1018 | <u>2.11</u> | 2.2 | Comparative Example |
| <u>10</u> | B | 2.6 | 9.5 | 0.0 | 0.0 | 90.5 | 10.5 | 1.002 | <u>0.66</u> | 0.82 | 1029 | <u>1.80</u> | 2.3 | Comparative Example |
| <u>11</u> | B | 2.6 | 10.5 | 0.0 | 0.0 | 89.5 | <u>10.7</u> | 1.015 | <u>0.68</u> | 0.82 | 1023 | <u>2.09</u> | 2.3 | Comparative Example |
| <u>12</u> | B | 2.6 | 13.1 | 0.0 | 0.0 | 86.9 | <u>10.8</u> | 1.009 | 0.46 | 0.90 | 1014 | <u>1.99</u> | 2.6 | Comparative Example |
| <u>13</u> | B | 2.6 | 13.5 | 0.0 | 2.2 | 84.3 | <u>10.8</u> | 1.005 | 0.47 | 0.87 | 951 | <u>1.97</u> | 2.5 | Comparative Example |
| 14 | C | 6.0 | 1.8 | 2.1 | 0.0 | 96.1 | 10.6 | 1.001 | 0.47 | 0.71 | 1212 | 1.52 | 2.3 | Present Invention Example |
| 15 | D | 2.6 | 2.6 | 0.0 | 0.0 | 97.4 | 10.3 | 1.000 | 0.46 | 0.83 | 1111 | 1.23 | 2.4 | Present Invention Example |

TABLE 4A-continued

| Manu-facturing No. | Steel No. | Sheet thickness m | Ferrite Area % | Residual austenite Area % | Pearlite Area % | Remainder in micro-structure Area % | E value — | I value — | Mn standard deviation Mass % | ds/dq — | Tensile strength TS MPa | Ratio of shear droop proportion between 20% clearance and 10% clearance X20/X10 — | Limit bend R/t — | Note |
|---|---|---|---|---|---|---|---|---|---|---|---|---|---|---|
| 16 | E | 2.6 | 3.4 | 0.0 | 0.0 | 96.6 | 10.3 | 1.005 | 0.42 | 0.77 | 1008 | 1.36 | 2.2 | Present Invention Example |
| <u>17</u> | E | 2.6 | 8.5 | <u>4.2</u> | 0.0 | 87.3 | 10.6 | <u>1.026</u> | 0.43 | 0.83 | 1026 | <u>2.15</u> | 2.4 | Comparative Example |
| 18 | F | 1.6 | 10.6 | 0.0 | 2.1 | 87.3 | 10.4 | 1.008 | 0.47 | 0.85 | 856 | 1.65 | 2.2 | Present Invention Example |
| <u>19</u> | F | 2.6 | 14.5 | 0.0 | <u>5.2</u> | 80.3 | 10.5 | 1.000 | 0.44 | 0.85 | <u>715</u> | <u>2.30</u> | 2.0 | Comparative Example |
| 20 | G | 2.6 | 1.9 | 2.9 | 0.0 | 95.2 | 10.5 | 1.003 | 0.51 | 0.79 | 1185 | 1.59 | 2.3 | Present Invention Example |

Underlines indicate that corresponding values are outside the range of the present invention or not preferable properties.

TABLE 4B

| Manu-facturing No. | Steel No | Sheet thickness mm | Ferrite Area % | Residual austenite Area % | Pearlite Area % | Remainder in micro-structure Area % | E value — | I value — | Mn standard deviation Mass % | ds/dq — | Tensile strength TS MPa | Ratio of shear droop proportion between 20% clearance and 10% clearance X20/X10 — | Limit bend R/t — | Note |
|---|---|---|---|---|---|---|---|---|---|---|---|---|---|---|
| 21 | H | 2.6 | 3.6 | 0.0 | 3.5 | 92.9 | 10.4 | 1.001 | 0.43 | 0.75 | 781 | 1.62 | 2.1 | Present Invention Example |
| 22 | I | 2.6 | 3.1 | 0.0 | 0.0 | 96.9 | 10.4 | 1.009 | 0.43 | 0.73 | 1049 | 1.49 | 2.1 | Present Invention Example |
| 23 | J | 2.6 | 3.9 | 0.0 | 0.0 | 96.1 | 10.4 | 1.006 | 0.43 | 0.83 | 1048 | 1.50 | 2.4 | Present Invention Example |
| 24 | K | 2.6 | 2.9 | 0.0 | 0.0 | 97.1 | 10.4 | 1.010 | 0.46 | 0.84 | 1020 | 1.49 | 2.4 | Present Invention Example |
| 25 | L | 2.6 | 3.4 | 0.0 | 0.0 | 96.6 | 10.3 | 1.010 | 0.45 | 0.66 | 982 | 1.50 | 2.0 | Present Invention Example |
| 26 | M | 2.6 | 3.5 | 0.0 | 0.0 | 96.5 | 10.4 | 1.005 | 0.43 | 0.81 | 1011 | 1.50 | 2.3 | Present Invention: Example |
| 27 | N | 2.6 | 2.6 | 0.0 | 0.0 | 97.4 | 10.3 | 1.005 | 0.47 | 0.78 | 991 | 1.33 | 2.2 | Present Invention Example |
| 28 | O | 2.6 | 3.1 | 0.0 | 0.0 | 96.9 | 10.2 | 1.004 | 0.46 | 0.76 | 1040 | 1.17 | 2.2 | Present Invention Example |
| <u>29</u> | <u>P</u> | 2.6 | <u>22.1</u> | 0.0 | 0.0 | 77.9 | 10.3 | <u>1.023</u> | 0.46 | 0.72 | <u>705</u> | <u>2.28</u> | 2.1 | Comparative Example |
| <u>30</u> | <u>Q</u> | 2.6 | <u>17.3</u> | 0.0 | 0.0 | 82.7 | 10.4 | 1.005 | 0.46 | 0.79 | 990 | <u>1.93</u> | 2.3 | Comparative Example |
| <u>31</u> | <u>R</u> | 2.6 | <u>33.5</u> | 0.0 | 0.0 | 66.5 | 10.3 | 1.006 | 0.40 | 0.85 | <u>665</u> | <u>2.32</u> | 2.4 | Comparative Example |
| <u>32</u> | <u>S</u> | 2.6 | 14.5 | 0.0 | 4.2 | 81.3 | 10.6 | 1.015 | 0.42 | 0.75 | <u>654</u> | <u>2.13</u> | 2.2 | Comparative Example |
| 33 | T | 2.6 | 5.2 | 0.0 | 0.0 | 97.1 | 10.4 | 1.010 | 0.43 | 0.65 | 984 | 1.49 | 2.4 | Present Invention Example |

TABLE 4B-continued

| Manufacturing No. | Steel No | Sheet thickness mm | Ferrite Area % | Residual austenite Area % | Pearlite Area % | Remainder in microstructure Area % | E value | I value | Mn standard deviation Mass % | ds/dq | Tensile strength TS MPa | Ratio of shear droop proportion between 20% clearance and 10% clearance X20/X10 | Limit bend R/t | Note |
|---|---|---|---|---|---|---|---|---|---|---|---|---|---|---|
| <u>34</u> | T | 2.6 | 4.2 | 0.0 | 0.0 | 95.8 | 10.4 | 1.007 | <u>0.63</u> | 0.73 | 986 | <u>1.74</u> | 2.2 | Comparative Example |
| <u>35</u> | T | 2.6 | 6.2 | 0.0 | 0.0 | 93.8 | <u>10.7</u> | 1.015 | <u>0.64</u> | 0.77 | 980 | <u>1.76</u> | 2.3 | Comparative Example |
| <u>36</u> | T | 2.6 | 8.2 | 0.0 | 0.0 | 91.8 | <u>10.8</u> | 1.010 | 0.46 | 0.72 | 972 | <u>1.85</u> | 2.1 | Comparative Example |
| <u>37</u> | T | 2.6 | 6.2 | 0.0 | 2.2 | 91.6 | <u>10.8</u> | 1.007 | 0.43 | 0.74 | 982 | <u>1.78</u> | 2.2 | Comparative Example |
| <u>38</u> | T | 2.6 | <u>16.5</u> | 0.0 | 4.1 | 79.4 | 10.4 | 1.010 | 0.44 | 0.68 | <u>765</u> | 2.15 | 2.0 | Present Invention Example |

Underlines indicate that corresponding values are outside the range of the present invention or not preferable properties.

From Table 4A and Table 4B, it is found that the hot-rolled steel sheets according to the present invention examples have excellent strength and shearing workability. In addition, it is found that, among the present invention examples, the hot-rolled steel sheets where ds/dq was 0.95 or less had the above various properties and further had excellent inside bend cracking resistance.

On the other hand, it is found that the hot-rolled steel sheets according to the comparative examples did not have any one or more of excellent strength and shearing workability.

INDUSTRIAL APPLICABILITY

According to the above aspect of the present invention, it is possible to provide a hot-rolled steel sheet having excellent strength and shearing workability. In addition, according to the preferable aspect according to the present invention, it is possible to obtain a hot-rolled steel sheet which has the above various properties and, furthermore, suppresses the occurrence of inside bend cracking, that is, has excellent inside bend cracking resistance.

The hot-rolled steel sheet according to the present invention is suitable as an industrial material used for vehicle members, mechanical structural members, and building members.

What is claimed is:

1. A hot-rolled steel sheet comprising, in terms of mass %, as a chemical composition:
   C: 0.050% to 0.250%;
   Si: 0.05% to 3.00%;
   Mn: 1.00% to 4.00%;
   one or two or more of Ti, Nb, and V: 0.060% to 0.500% in total;
   sol. Al: 0.001% to 2.000%;
   P: 0.100% or less;
   S: 0.0300% or less;
   N: 0.1000% or less;
   O: 0.0100% or less;
   Cu: 0% to 2.00%;
   Cr: 0% to 2.00%;
   Mo: 0% to 1.00%;
   Ni: 0% to 2.00%;
   B: 0% to 0.0100%;
   Ca: 0% to 0.0200%;
   Mg: 0% to 0.0200%;
   REM: 0% to 0.1000%;
   Bi: 0% to 0.020%;
   one or two or more of Zr, Co, Zn, and W: 0% to 1.00% in total;
   Sn: 0% to 0.05%; and
   a remainder consisting of Fe and impurities,
   wherein, a microstructure has,
      in terms of area %, residual austenite at less than 3.0%, ferrite at less than 15.0%, and pearlite at less than 5.0%,
   an E value that indicates periodicity of the microstructure is less than 10.7, and an I value that indicates uniformity of the microstructure is less than 1.020,
   a standard deviation of a Mn concentration is 0.60 mass % or less, and
   a tensile strength is 780 MPa or more.

2. The hot-rolled steel sheet according to claim 1, wherein ds/dq, which is a ratio of an average crystal grain size ds of a surface layer to an average crystal grain size dq at a ¼ depth position of a sheet thickness from a surface, is 0.95 or less.

3. The hot-rolled steel sheet according to claim 1, further comprising, in terms of mass %, one or more of, as the chemical composition:
   Cu: 0.01% to 2.00%;
   Cr: 0.01% to 2.00%;
   Mo: 0.01% to 1.00%;
   Ni: 0.02% to 2.00%;
   B: 0.0001% to 0.0100%;
   Ca: 0.0005% to 0.0200%;
   Mg: 0.0005% to 0.0200%;
   REM: 0.0005% to 0.1000%; and
   Bi: 0.0005% to 0.020%.

4. The hot-rolled steel sheet according to claim 2, further comprising, in terms of mass %, one or more of, as the chemical composition:
   Cu: 0.01% to 2.00%;
   Cr: 0.01% to 2.00%;
   Mo: 0.01% to 1.00%;

Ni: 0.02% to 2.00%;
B: 0.0001% to 0.0100%;
Ca: 0.0005% to 0.0200%;
Mg: 0.0005% to 0.0200%;
REM: 0.0005% to 0.1000%; and
Bi: 0.0005% to 0.020%.

5. A hot-rolled steel sheet comprising, in terms of mass %, as a chemical composition:
C: 0.050% to 0.250%;
Si: 0.05% to 3.00%;
Mn: 1.00% to 4.00%;
one or more of Ti, Nb, and V: 0.060% to 0.500% in total;
sol. Al: 0.001% to 2.000%;
P: 0.100% or less;
S: 0.0300% or less;
N: 0.1000% or less;
O: 0.0100% or less;
Cu: 0% to 2.00%;
Cr: 0% to 2.00%;
Mo: 0% to 1.00%;
Ni: 0% to 2.00%;
B: 0% to 0.0100%;
Ca: 0% to 0.0200%;
Mg: 0% to 0.0200%;
REM: 0% to 0.1000%;
Bi: 0% to 0.020%;
one or more of Zr, Co, Zn, and W: 0% to 1.00% in total;
Sn: 0% to 0.05%; and
a remainder comprising Fe and impurities,
wherein, a microstructure has,
in terms of area %, residual austenite at less than 3.0%, ferrite at less than 15.0%, and pearlite at less than 5.0%,
an E value that indicates periodicity of the microstructure is less than 10.7, and an I value that indicates uniformity of the microstructure is less than 1.020,
a standard deviation of a Mn concentration is 0.60 mass % or less, and
a tensile strength is 780 MPa or more.

* * * * *